(12) United States Patent
Kawawaki

(10) Patent No.: US 8,036,948 B2
(45) Date of Patent: Oct. 11, 2011

(54) ARTICLE JOINT PURCHASE SYSTEM USING NETWORK

(75) Inventor: Hideo Kawawaki, Kashiwa (JP)

(73) Assignee: Interior Keikaku Inc., Chiba (JP)

( * ) Notice: Subject to any disclaimer, the term of this patent is extended or adjusted under 35 U.S.C. 154(b) by 752 days.

(21) Appl. No.: 10/599,067

(22) PCT Filed: Nov. 30, 2005

(86) PCT No.: PCT/JP2005/021993
§ 371 (c)(1),
(2), (4) Date: Sep. 3, 2008

(87) PCT Pub. No.: WO2007/004318
PCT Pub. Date: Jan. 11, 2007

(65) Prior Publication Data
US 2009/0012913 A1    Jan. 8, 2009

(30) Foreign Application Priority Data

Jun. 30, 2005    (JP) ................................ 2005-193023

(51) Int. Cl.
*G06Q 30/00* (2006.01)
(52) U.S. Cl. .................................................... 705/26.2
(58) Field of Classification Search .................. 705/26.2
See application file for complete search history.

(56) References Cited

U.S. PATENT DOCUMENTS

| 6,631,356 B1 * | 10/2003 | Van Horn et al. ............ 705/26.2 |
| 7,689,463 B1 * | 3/2010 | Mesaros ....................... 705/26.5 |
| 2003/0018560 A1 * | 1/2003 | Dietrich .......................... 705/37 |

FOREIGN PATENT DOCUMENTS

JP    2001-155067    6/2001

OTHER PUBLICATIONS

Carter, S., Macdonald, N.J., and Cheng, D.C.B., Basic Finance for Marketers, Food and Agriculture Organization of the United Nations, Rome, 1997, front cover, title page, copyright page, pp. 61-70.*
National Association of Cost Accountants, "The Analysis of Cost-Volume-Profit Relationships," NACA Bulletin, Dec. 1949, pp. 523.*
Ratnam, P.V., "India: Cost and Management Accounting," Businessline, Chennai, Aug. 13, 2001, p. 1.*

(Continued)

*Primary Examiner* — Nathan Erb
(74) *Attorney, Agent, or Firm* — Alston & Bird LLP

(57) ABSTRACT

A flexible joint purchase order system in which a sales price is determined based on demand without causing a seller to have a loss, comprising: an accepting means for accepting purchase application information and reporting an application for purchase, an entry price of an article, and a desired quantity; an order data table for storing the application for purchase, the entry price, and the desired quantity; a condition table for registering an initial cost, a fixed cost, and a maximum sales quantity; and a network for comparing a first value (equal to the entry price times the desired quantity of articles entered at prices equal to or higher than the entry price) with a second value (equal to the initial cost added to the product of the fixed cost and the desired quantity), for determining the sales to be made, and for transmitting the entry price as the sales-determined price.

3 Claims, 4 Drawing Sheets

OTHER PUBLICATIONS

Taylor, Chris, "T-Shirts: Where the Money Goes," Canadian Musician, Jan./Feb. 2005, p. 62.*

Marshall, P. Douglas, "Pricing Products & Services: An Accounting Perspective," The National Public Accountant, May 2000, pp. 40-44.*

The International Search Report for International Application No. PCT/JP2005/021993; Filed Nov. 30, 2005; Date of Completion Dec. 20, 2005; Date of Mailing Jan. 10, 2006.

* cited by examiner

US 8,036,948 B2

ARTICLE JOINT PURCHASE SYSTEM USING NETWORK

TECHNICAL FIELD

The present invention is effective when applied to a server technique of managing joint purchase of an article using a network such as the Internet.

BACKGROUND ART

Internet technologies have become rapidly widespread, and have therefore increasingly been adopted for purchase or placement of an order of an article.

In an article sales site called a shopping mall, an article purchase process can be performed through a screen of a terminal device. For example, a user checks an article to be purchased on the screen and specifies a button image of "application for purchase" displayed on the screen, so that the application for purchase is transmitted to a server.

On the other hand, a system for mediating purchase and sales between individuals, called an auction, has also been known. In an auction site, applicants for purchase input desired prices of a provided article through terminal devices, and an applicant for purchase offering the highest desired price among the applicants for purchase wins a bid for the article.

Further, a system for realizing a "reverse auction" shown in U.S. Pat. No. 5,794,207 on a network has recently been known. This system uses a method performed by Priceline in the US (http://www.priceline.com), in which an applicant for purchase of an article (such as an airline ticket) offers a desired price, and a seller meeting a condition of the desired price accepts a bid.

With respect to such auction systems, the inventors of the present invention have filed a prior patent application focusing on a problem inherent in the joint purchase (Patent Document 1).

Patent Document 1: U.S. Pat. No. 5,794,207
Patent Document 2: JP 2001-155067 A

DISCLOSURE OF THE INVENTION

Problems to be Solved by the Invention

Patent Document 1 merely provides a system for purchasing and selling articles on the assumption that the articles are already traded in a market.

Meanwhile, conventionally known is that a unit price of purchasing a piece of furniture or an article/product produced by using a mold can be reduced by ordering by a predetermined quantity (lot) in view of a material procurement cost and a container transportation cost.

However, work of managing quantities is conventionally carried out by a wholesaler or a business firm, and articles/products fitted to users' needs are not always ordered by lot.

In recent years, a consumer cooperative or the like uses a joint purchase system to purchase fresh food such as vegetables from farms at low prices. However, a purchase process thereof is performed just by following an order from a cooperator.

In other words, a system open to users and allowing the users to receive merits of the joint purchase ordering on a lot basis is desired. Further, from a viewpoint of an organizer of the joint purchase, it is difficult to decide a quantity at which an order is placed after accepting orders from applicants. In other words, a "demand-and-supply curve" indicating that a price is determined based on a balance of supply and demand is known in economics, and this is just applied to a completely open, independent, and static market in which free competition is completely realized, so that it is practically difficult to determine an order using the "demand-and-supply curve".

In general, cost-initiative price determination is made in which a profit margin is added to a cost to obtain the price. A technique of reducing the total cost with respect to a "desired market price" has been developed in recent years, but it is difficult to determine the "desired market price". In other words, an optimum price cannot be calculated because price competition changes from day to day, a price reflecting consumer needs (a price at which the majority of customers desire to purchase) changes momentarily, and thus it takes a long time to analyze where to balance even after a repetition of experiments in a test market.

From the point of view, the inventors of the present invention have filed a prior patent application of Patent Document 2.

In Patent Document 2, an article joint purchase order system is proposed in which a unit price can be reduced through production by a particular quantity (lot) in view of the material procurement and transportation quantity, and real-time determination of a joint purchase price reflecting customer needs from the market is made possible.

However, the inventors of the present invention focus on a limit sales price of an article ordered by one lot while studying the joint purchase system.

In other words, in Patent Document 2, a lowest sales price is obtained when the number of orders received from the users reaches the quantity of one lot. It is found that if the lowest sales price is set to a limit sales price for the lot in advance, a seller has no fear of causing a loss produced by a sales price equal to or lower than a purchasing cost.

The present invention has been made in view of the above-mentioned circumstances, and proposes a flexible joint purchase order system in which a unit price can be reduced through production by a particular quantity (lot) in view of the material procurement and transportation quantity, and a sales price is determined based on demand without causing a seller to have a loss in relation to producing and purchasing costs.

Means for Solving the Problem

In order to solve the above-mentioned problems, the present invention employs the following means.

The present invention provides an article joint purchase system using a network, for managing, via the network, purchase application information on an article which is inputted by each of a plurality of applicants for purchase through a terminal device, the article being produced, transported, or purchased on a lot basis on the network, the system including: an accepting means for accepting the purchase application information inputted through the terminal device and reporting an application for purchase, an entry price (a price at which or under which the purchase is desired) of a particular article, and a desired quantity; an order data table for storing the application for purchase, the entry price, and the desired quantity, in association with one another; a condition table for registering an initial cost obtained by adding a profit to an initial production cost that includes a design cost and an artwork production cost, a fixed cost obtained by adding a material cost per one piece of the article to a production cost per one piece of the article, and a maximum sales quantity which corresponds to the quantity of the article in one lot; and a quantity and price determining means for comparing a first value obtained, each time when the purchase application information is accepted by the accepting means, by multiplying the entry price set in the purchase application information by the total of desired quantities entered at prices equal to or higher than the entry price at the time of acceptance with a second value obtained by adding the initial cost to a value obtained by multiplying the fixed cost by the total of desired quantities entered at prices equal to or higher than the entry price at the time of acceptance, for determining the sales to be made to the purchase application information if the first value is equal to or larger than the second value, and for transmitting the entry price as a sales-determined price to the terminal device.

As described above, the introduction of a concept of the limit sales price (redprice) prevents the sales price from dropping to be lower than the purchasing cost. Further, the user sets an entry price to apply for purchase, so that a flexible joint purchase in which a sales price is determined based on demand can be realized.

The present invention provides an article joint purchase system using a network, in which the quantity and price determining means calculates a current price by using the following formula:

Current price=initial cost÷(total of desired quantities× α+β)+fixed cost where $1 \geq (\alpha+\beta)$,
and transmits the current price to the terminal device.

Further, the present invention provides an article joint purchase system using a network, in which the condition table further registers a joint purchase start price obtained by adding the initial cost to the fixed cost, and a limit sales price that is a lowest price per one piece of the article in one lot.

Further, the present invention provides an article joint purchase system using a network, in which the limit sales price is obtained by adding the fixed cost to a value obtained by dividing the initial cost by the maximum sales quantity.

It can be swiftly decided whether or not the sales are determined for an applicant for purchase who offers an entry price with respect to an article price which changes dynamically.

EFFECTS OF THE INVENTION

According to the present invention, there is realized a flexible joint purchase order system in which a unit price can be reduced through production by a particular quantity (lot) in view of the material procurement and transportation quantity, and a sales price is determined based on demand without causing a seller to have a loss in relation to producing and purchasing costs.

Figure 1:
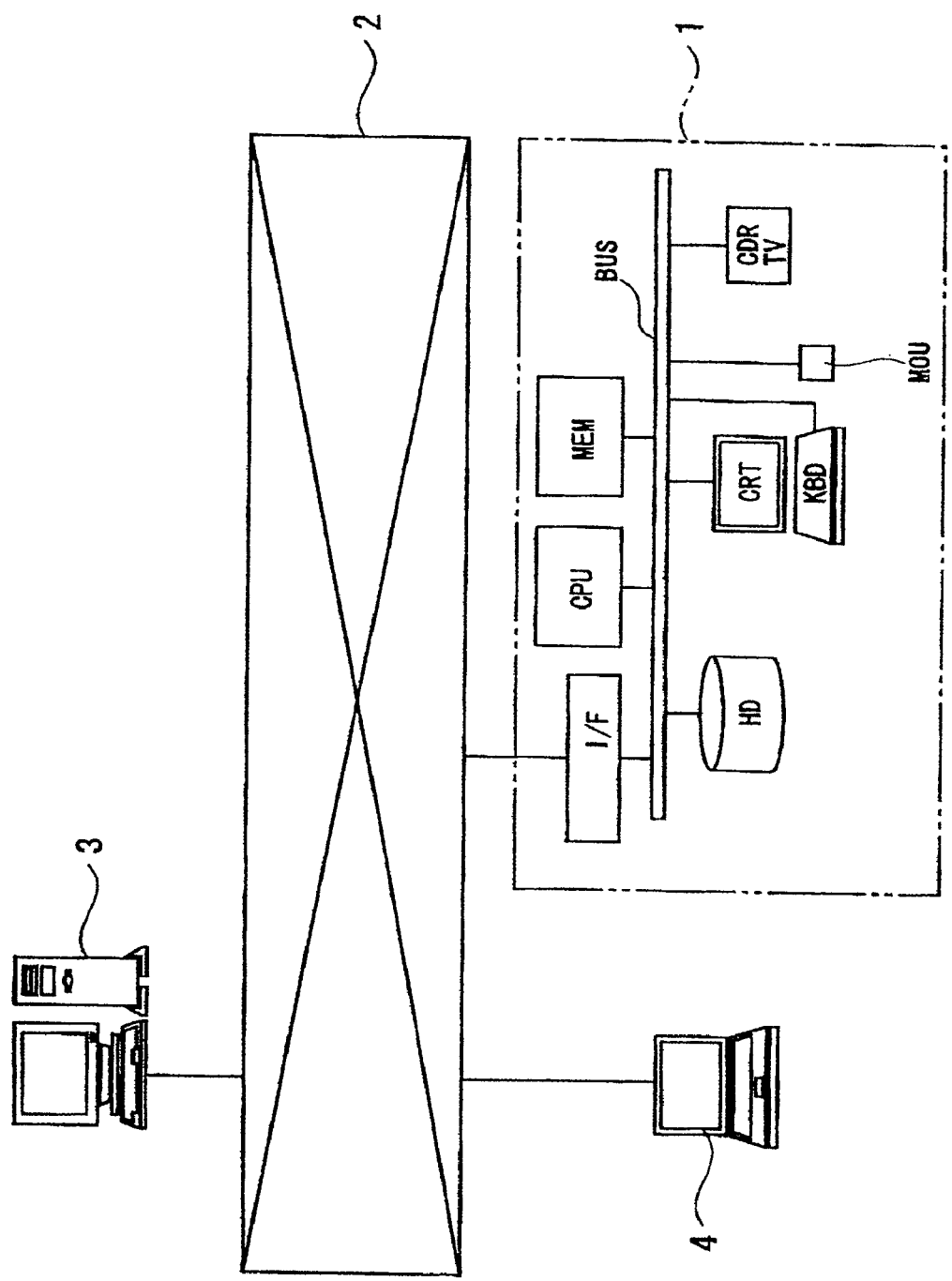
FIG. 1 A block diagram showing a network configuration according to the present invention.

DESCRIPTION OF SYMBOLS 1 joint purchase server
2 network
3, 4 terminal device
21 order accepting section
22 quantity and price determining section
23 order processing section
24 order data table
25 condition table
25a price table
25b basic condition table
25c cost table
41 article describing area
42 purchase detailed-information displaying area
43 advertising area
44 purchase application area

BEST MODE FOR CARRYING OUT THE INVENTION

Embodiment 1

FIG. 1 is a diagram showing a network configuration according to the present invention. As shown in FIG. 1, a joint purchase server 1 is connected to terminal devices 3 and 4 via a network 2.

The joint purchase server 1 includes a central processing unit (CPU), a memory (MEM), a hard disk device (HD), and a CD-ROM drive device (CDRDV), which are connected to one another via a bus (BUS). Further, a display device (CRT) serving as a display unit, a keyboard (KBD) serving as an input device, and a mouse (MOU) serving as an auxiliary input device are connected via the bus (BUS). The bus (BUS) is connected to the network 2 via a communication interface (I/F).

A program of Embodiment 1 to be described below is provided for the joint purchase server 1 in the form of a medium such as a CD-ROM, and is installed in the hard disk device (HD) by the CD-ROM drive device (CDRDV). The program installed in the hard disk device (HD) is called to the memory (MEM) when needed, and sequentially executed by the central processing unit (CPU).

Figure 2:
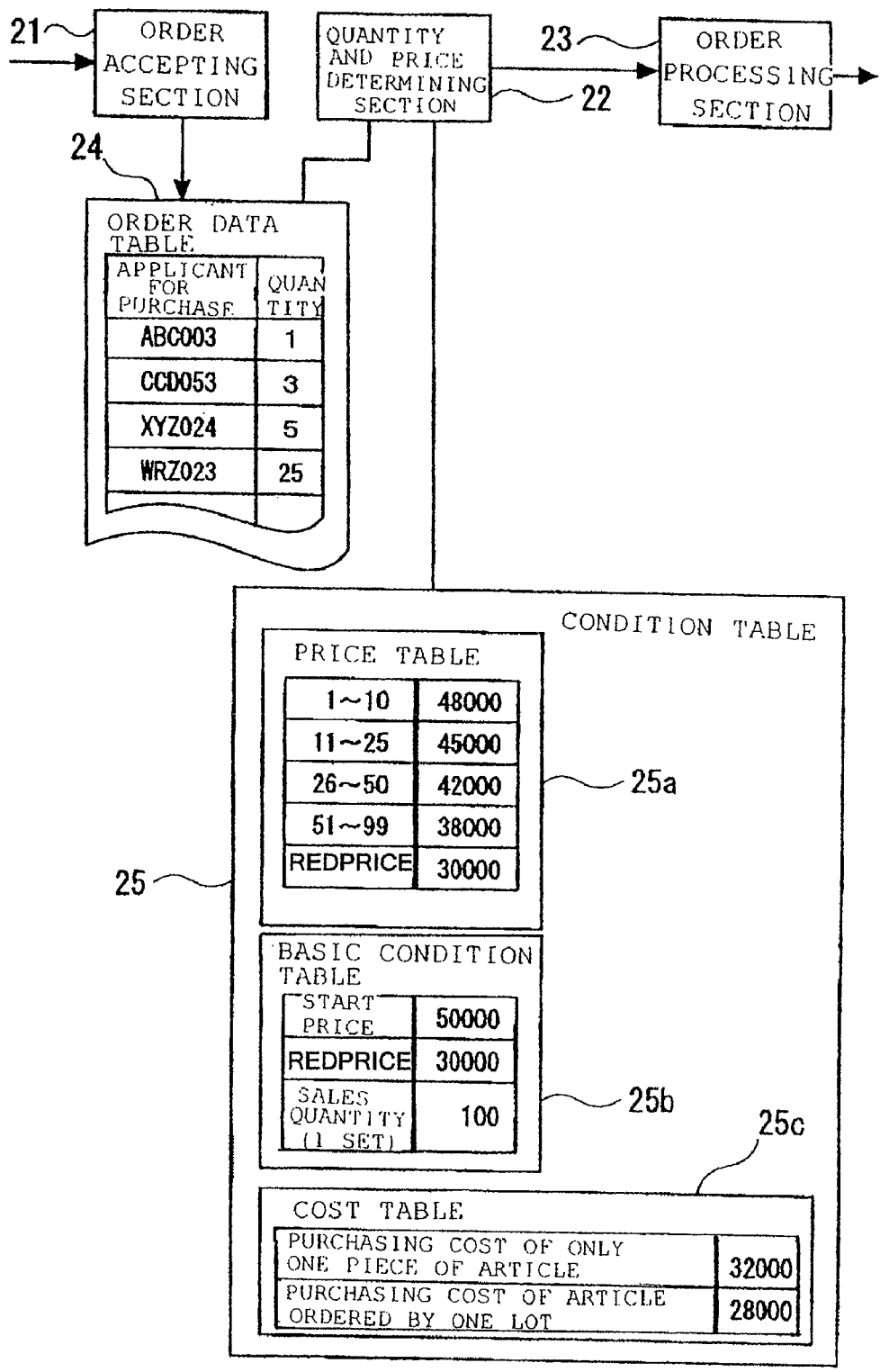
FIG. 2 A functional block diagram according to the present invention.

FIG. 2 is a block diagram showing functions of Embodiment 1 executed by the program. An order accepting section 21 has a function of accepting orders inputted through the terminal devices 3 and 4 of users.

Figure 3:
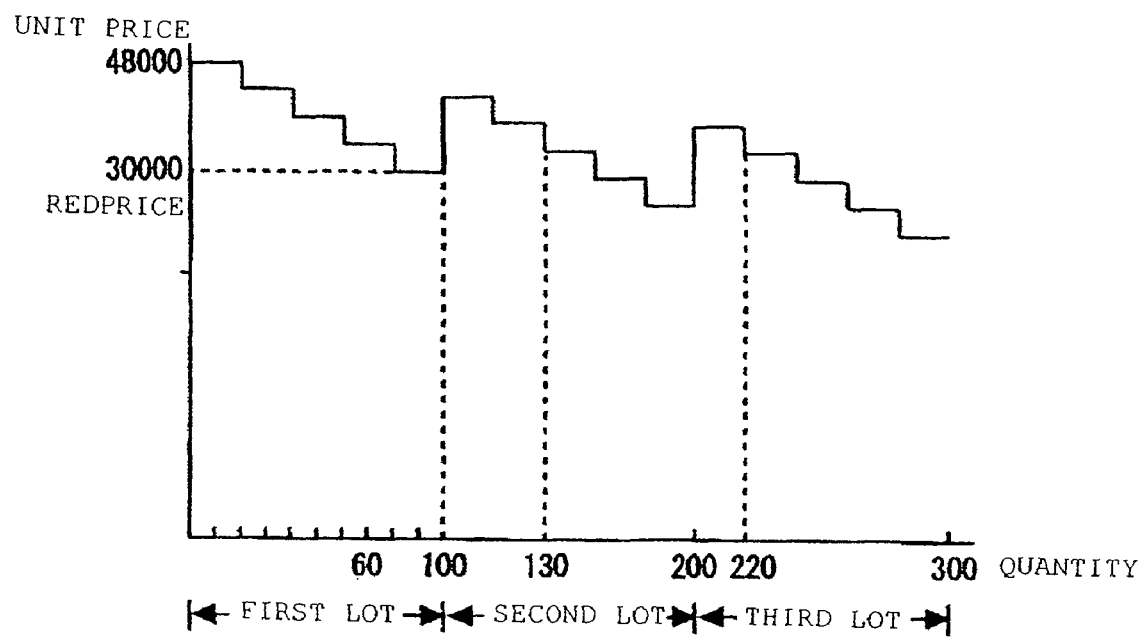
FIG. 3 A graph chart showing characteristics of price determination according to the present invention.

FIG. 3 is a graph chart showing characteristics of article sales price determination of Embodiment 1. As shown in FIG. 3, the price drops stepwise when the quantity reaches predetermined levels (see a price table 25a shown in FIG. 2).

Figure 4:
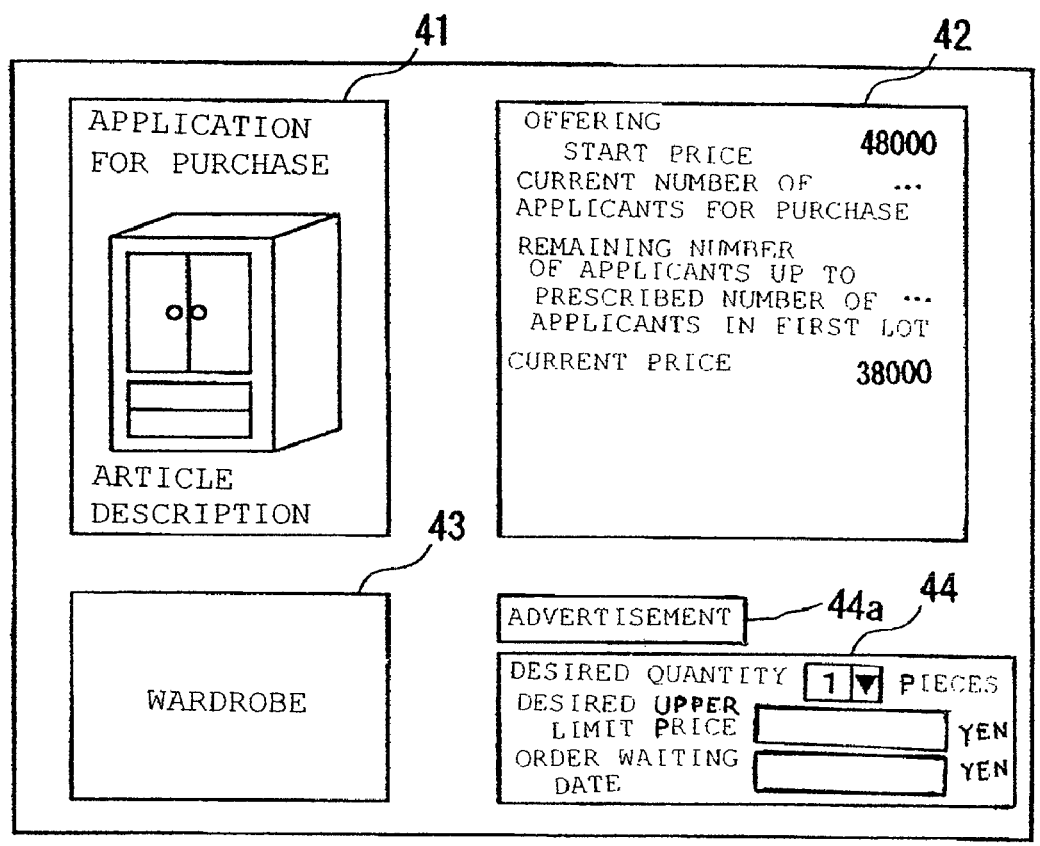
FIG. 4 A diagram showing an example of a screen display of a terminal device.

FIG. 4 is an example of a screen displayed on a display device of each of the terminal devices 3 and 4 of the users. An HTML file (hyper-text mark-up language file) stored in the hard disk device (HD) of the joint purchase server 1 is distributed via the network 2, so that each user can view the file on the screen.

The screen is constituted by an article describing area 41, a purchase detailed-information displaying area 42, an advertising area 43, and an application area 44. The article describing area 41 displays an article name and an article image. In this example, a "wardrobe" is displayed as an article.

The purchase detailed-information displaying area 42 displays detailed information about purchasing the article. Displayed herein are a price offered at the time of start of receiving purchase applications, the number of applicants for purchase at the time of viewing (the current number of applicants for purchase or the current quantity of the article), the remaining number (the remaining number of applicants or the remaining quantity of the article) up to a prescribed number in a first lot, and a price offered at the time of viewing (the current price).

Information displayed in the purchase detailed-information displaying area 42 is updated in real time or every day as the number of applicants for purchase increases. In this embodiment, the price of the article offered to the applicants for purchase is calculated by the program installed in the joint purchase server 1. A price determination method will be described later.

The application area 44 is used by the user, when the user decides to purchase an article, to input the desire quantity of the article, a desired upper limit price, and an order waiting date. When the user clicks a purchase application button 44a with the mouse or the like after inputting those pieces of data, the inputted order data is transmitted to the joint purchase server 1 from the terminal device 3 or 4 via the network 1.

The order data is handled by the order accepting section 21 as described blow. The order accepting section 21 stores the order data transmitted from the terminal device 3 or 4 in an order data table 24 in the hard disk device (HD) via the communication interface (I/F) and the bus (BUS).

A quantity and price determining section 22 is realized by the program executed by the central processing unit, and determines the current real purchase-desired quantity and the unit price while referring to a condition table in the hard disk device (HD). The real quantity means the quantity of the article which can be ordered at the desired upper limit price or lower, extracted by comparing the desired upper limit price set in the order data table 24 with the unit price set in the condition table.

The condition table 25 is constituted by a price table 25a, a basic condition table 25b, and a cost table 25c.

When a joint purchase start price (in this case, ¥50,000), a limit sales price (redprice: in this case, ¥30,000), and the quantity of an article in one lot (in this case, 100 pieces) are inputted from the terminal device 3, the quantity and price determining section 22 registers those values in the basic condition table 25b. Note that the limit sales price (redprice) is set to a price equal to or higher than the cost of the article ordered by one lot, the cost being registered in the cost table 25c.

Next, when a purchasing cost of only one piece of the article (in this case, ¥32,000) and a purchasing cost of the article ordered by one lot (in this case, ¥28,000) are inputted from the terminal device 3, the quantity and price determining section 22 registers those values in the cost table 25c.

Next, the quantity and price determining section 22 sets prices of the article for respective quantities other than the limit sales price (redprice) in the price table 25a. Those prices are required to be set to prices higher than the purchasing cost of only one piece of the article set in the cost table 25c.

In a first step, the price is set to ¥48,000 for 1 to 10 pieces of the article; to ¥45,000 for 11 to 25 pieces of the article; to ¥42,000 for 26 to 50 pieces of the article; and to ¥38,000 for 51 to 99 pieces of the article.

Note that if all the pieces of the article in the first lot (100 pieces) are sold out within a sales period set for the first lot, a transition is made to the joint purchase process of a second lot (101 to 200 pieces) immediately.

For the second lot, the joint purchase start price is set to the same price as that of the first lot. At this time, in a case where the sales period expires before the pieces of the article in the second lot are sold out, the sales price for the users who have transmitted purchase application information for the first lot is set to the limit sales price (redprice) of the first lot, and the sales price for the users who have transmitted purchase application information for the second lot is set to the current price of the second lot.

Note that the limit sales price (redprice) of the second lot can also be set to a price lower than that of the first lot. In this case, when the pieces of the article in the second lot (101 to 200 pieces) are sold out in the sales period, the limit sales price (redprice) of the second lot may be applied to the users who have determined to purchase the article in the first lot.

Embodiment 2

A system configuration of Embodiment 2 is about the same as that of Embodiment 1. Embodiment 2 is characterized in that an entry price (not shown) offered by each applicant for purchase is set in the order data table 24.

The entry price used herein indicates a price at which or under which an applicant for purchase desires to purchase.

A description is given of an example of the entry price of an article assuming that the article is a T-shirt.

First, when the current price is ¥1,000,500 and an entry (an application for purchase) of one piece of the T-shirt is made at ¥5,000, the current price remains ¥1,000,500 because the entry is made for one piece of the T-shirt. When the next applicant for purchase makes an entry of one piece at ¥2,000, the total number of pieces in the entries is two, so the current price is calculated as follows: 1,000,000÷(2×0.5+0.5)+500=¥667,166.

When the next applicant for purchase makes an entry of one piece at ¥5,000, the total number of pieces in the entries is three, so the current price is calculated as follows: 1,000,000÷(3×0.5+0.5)+500=¥500,500.

Further, when the next applicant for purchase makes an entry of one piece at ¥8,000, the total number of pieces in the entries is four, so the current price is calculated as follows: 1,000,000÷(4×0.5+0.5)+500=¥400,500.

Further, when the next applicant for purchase makes an entry of one piece at ¥3,000, the total number of pieces in the entries is five.

Calculation is performed for each entry as follows:

$$¥3,000(\text{entry price})\times 4\text{ pieces(the number of entries made at ¥3,000 or higher)}=¥12,000.$$

Herein, ¥500×4 pieces+¥1,000,000=¥1,002,000. At this point, the sales are not established.

An initial cost (including a profit) of the article, a fixed cost, and the maximum sales quantity (the quantity in one lot) are set in the condition table 25 although not shown.

The initial cost is obtained by adding a profit to initial production costs, such as a design cost and an artwork production cost. The fixed cost is the sum of a material cost per one piece of the article and a production cost per one piece of the article.

Based on the values set in the condition table 25, a joint purchase start price and a limit sales price can be calculated by the following formulae.

$$\text{Joint purchase start price}=\text{initial cost}+(\text{fixed cost}\times 1)$$

$$\text{Limit sales price(redprice)}=(\text{initial cost}\div\text{set maximum sales quantity})+\text{fixed cost}$$

The current price, which continuously changes, is calculated by the quantity and price determining section 22 using the following formula.

$$\text{Current price}=\text{initial cost}\div(\text{total number of applications}\times 0.5+0.5)+\text{fixed cost}$$

where, each of the two parameters, which are set to 0.5 herein, can be set to any value as long as the sum of the two parameters is 1.0 or less.

Next, in Embodiment 2, when purchase application information is transmitted from the terminal device 3 or 4, the quantity and price determining section 22 compares a first value obtained by multiplying the entry price by the total of desired quantities entered at prices equal to or higher than the entry price at that point, with a second value obtained by adding the initial cost to a value obtained by multiplying the fixed cost by the total of desired quantities entered at prices equal to or higher than the entry price at that point. If the first value is equal to the second value or larger, the quantity and price determining section 22 determines the sales to be made to the purchase application information, and sets the entry price as the limit sales price.

The process will be described specifically.

A=entry price×the number of applications entered at prices equal to or higher than the entry price B=initial cost+(the number of applications entered at prices equal to or higher than the entry price×fixed cost)

Determination formula: $A \geq B$

If the determination formula is satisfied, sales determination information is created with respect to the purchase application information having the entry price, and transmitted to the terminal device 3 or 4.

Next, a concrete example of Embodiment 2 will be described.

Assumed is a case of asking an artist or the like to design an original T-shirt, and selling the T-shirt in a joint purchase.

Initial cost=¥1,000,000

Fixed cost=¥500

Set maximum sales quantity (the quantity in one lot)=1,000 pieces

Limit sales price (redprice)=¥1,500

Under the above-mentioned condition, purchase application information having an entry price of ¥2,000, which is the 667th application is received from the terminal device 3 or 4.

Example 1

With the current price being ¥3,499, if the previous 666 entries have also been made to have prices equal to or higher than ¥2,000 at the time of receiving the purchase application information, the following formulae are obtained.

$$A=2,000 \times 667=1,334,000$$

$$B=1,000,000+(667 \times 500)=1,333,500$$

Since $A \geq B$ is satisfied, the quantity and price determining section 22 determines the sales to be made at this point, and sets the price to ¥2,000.

Note that when the number of applications for purchase reaches the set maximum sales quantity (in this case, 1,000 pieces), the sales price is set to the limit sales price (redprice) and the joint purchase process in this lot is finished.

In other words, in a case of the joint purchase of the T-shirt, if the current price is ¥2,500 after the inputs, or entries, of purchase application information for 999 pieces of the T-shirt, when an entry of application for purchase having any price is received for the 1,000th T-shirt, the sales for the entry are determined at the limit sales price (redprice: in this case, ¥1,500).

As described above, in Embodiment 2, since the initial cost includes a profit, the profit is not influenced by the quantity of sold pieces of the article. For example, in a case where the T-shirt is treasurable or the like, when the sales are determined for production of only one piece of the T-shirt, that is, when an entry of application for purchase having a desired price of ¥1,000,500 is received if the joint purchase start price is ¥1,000,500, the desired price reaches the limit sales price at this point and the sales are finished.

As described above, according to Embodiment 2, the price is determined based on demand, so a flexible joint purchase is realized.

Note that an order processing section 23 places an order for the article every time the number of applications for purchase reaches the predetermined quantity (100 pieces) of the first lot. Although a detailed description of the order placement is omitted, an order may be placed by sending a purchase order by fax to a manufacturer or by sending Internet mail to a manufacturer.

INDUSTRIAL APPLICABILITY

The present invention can be applied to a joint purchase on a network handling the quantity of one to several hundreds in one lot.

The invention claimed is:

1. An article joint purchase system using a network, for managing, via the network, purchase application information on an article which is inputted by each of a plurality of applicants for purchase through a terminal device, the article being produced, transported, or purchased on a lot basis on the network, the system comprising:

an accepting means for accepting the purchase application information inputted through the terminal device and reporting an application for purchase, an entry price (which is a price at which or under which purchase is desired) of the article, and a desired quantity;

an order data table for storing the application for purchase, the entry price, and the desired quantity, in association with one another;

a condition table for registering a resultant initial cost obtained by adding a profit to an initial production cost that includes a design cost and an artwork production cost, a fixed cost obtained by adding a material cost per one piece of the article to a production cost per one piece of the article, and a maximum sales quantity which corresponds to the quantity of the article in one lot; and a quantity and price determining means for:

comparing a first value obtained, each time the purchase application information is accepted by the accepting means, by multiplying the entry price set in the purchase application information by the total of desired quantities entered at prices equal to or higher than the entry price at the time of acceptance, with a second value obtained by adding the resultant initial cost registered in the condition table to a value obtained by multiplying the fixed cost by the total of desired quantities entered at prices equal to or higher than the entry price at the time of acceptance, and determining the sales to be made with respect to the purchase application information and transmitting the entry price as a sales-determined price to the terminal device if the first value is equal to or larger than the second value, the quantity and price determining means declining to determine the sales to be made if the first value is less than the second value;

wherein the quantity and price determining means calculates a current price by using the following formula:

Current price=resultant initial cost÷(total of desired quantities×α+β)+fixed cost, where $\alpha$ and $\beta$ are parameters that are set by a user with $1 \geqq (\alpha+\beta)$, and transmits the current price to the terminal device.

2. The article joint purchase system using a network according to claim 1, wherein the condition table further registers a joint purchase start price obtained by adding the resultant initial cost to the fixed cost, and a limit sales price that is a lowest price per one piece of the article in one lot.

3. The article joint purchase system using a network according to claim 2, wherein the limit sales price is obtained by adding the fixed cost to a value obtained by dividing the resultant initial cost by the maximum sales quantity.

\* \* \* \* \*